K. C. GARDNER.
FLEXIBLE SHAFT COUPLING.
APPLICATION FILED MAR. 17, 1915.
1,231,249.
Patented June 26, 1917.
2 SHEETS—SHEET 2.
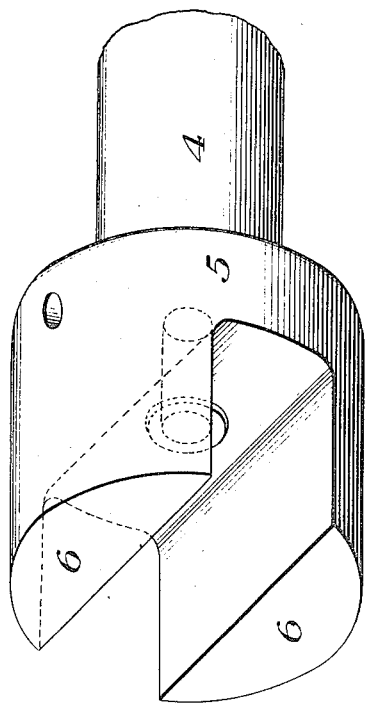
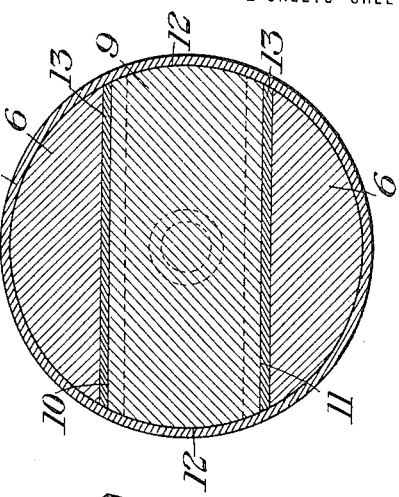
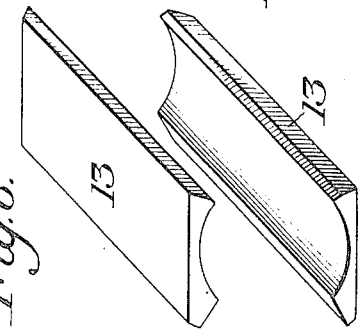
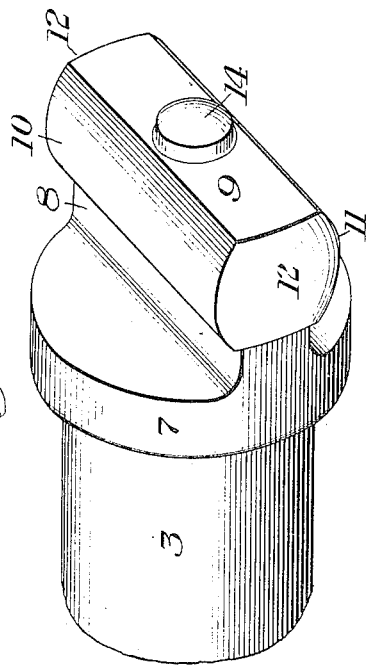
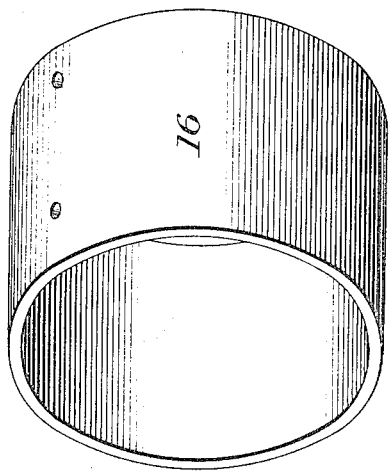
WITNESSES
INVENTOR
K. C. Gardner

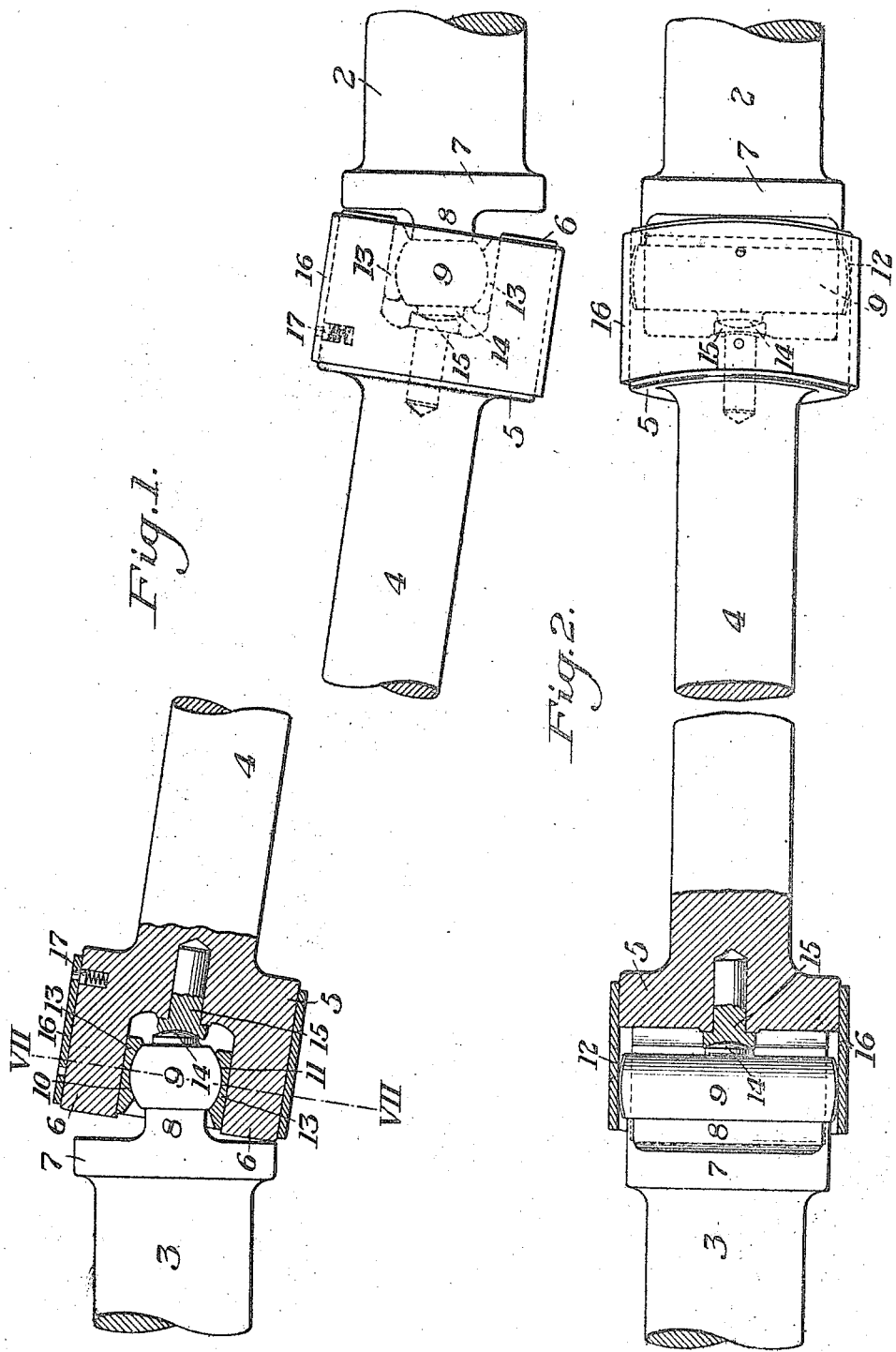

UNITED STATES PATENT OFFICE.

KIRTLAND C. GARDNER, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

FLEXIBLE SHAFT-COUPLING.

1,231,249.             Specification of Letters Patent.      Patented June 26, 1917.

Application filed March 17, 1915. Serial No. 14,933.

*To all whom it may concern:*

Be it known that I, KIRTLAND C. GARDNER, a citizen of the United States, residing at Pittsburgh, Allegheny county, Pennsylvania, have invented a new and useful Improvement in Flexible Shaft-Couplings, of which the following is a full, clear, and exact description, reference being had to the accompanying drawings, forming part of this specification, in which—

Figures 1 and 2 are views partly in plane and partly in section, and partly broken away, the two views being taken in planes at substantially right angles to each other, and showing a form of coupling embodying my invention.

Figs. 3, 4, 5 and 6 are detail perspective views of certain of the parts, and

Fig. 7 is a section on the line VII—VII of Fig. 1.

My invention has relation to flexible couplings for shafts; and is designed to provide a simple and durable coupling of this character capable of transmitting heavy loads and adapted for heavy work, as, for instance, in rolling mill drives. My invention is also designed to provide a coupling of this character in which the parts can be readily assembled and taken apart, and in which those parts subject to greatest wear can be readily renewed.

The nature of my invention will be best understood by reference to the accompanying drawings, in which I have shown a preferred embodiment thereof and which will now be described, it being premised, however, that various changes can be made in the details of construction and arrangement of the parts without departing from the spirit and scope of my invention as recited in the appended claims.

In Figs. 1 and 2 I have shown my invention as applied to a rolling mill drive, in which the numeral 2 may represent a mill roll neck, 3 a driving shaft, and 4 a coupling spindle which is connected to the shaft 3 by a flexible joint embodying my invention, and to the roll 2 by another similar flexible joint. It will be understood, however, that my invention is not limited to this particular use, and that the male and female members of the coupling may be interchanged, either one of these members being on the driving shaft and the other on the driven shaft or part. As the two couplings shown in these figures are of the same construction, but one of them will be specifically described and corresponding reference characters will be applied to both. I will specifically describe the coupling at the left hand end of Figs. 1 and 2, and shown in detail in the other figures.

The spindle 4 has a head or enlargement 5 at the end which is centrally slotted or cut away from side to side to form the parallel jaws 6. The shaft 3 has the head 7 at its end formed with the projecting neck portion 8 which terminates in the bearing member 9. This bearing member has the two opposite bearing surfaces 10 and 11 which are of convex form, being segments of a cylinder. The ends of said bearing member project slightly beyond the periphery of the head 7 and are convexed, as indicated at 12, and for the purpose hereinafter described. 13 designate removable bearing shoes which are seated within the jaws 6 and which have concave bearing surfaces adapted to the convex bearing surfaces 10 and 11 of the member 9. Said member 9 is also shown as having the central axial convex projection 14 which has a bearing in the concaved head of a stud 15 seated in the head 5. The purpose of the projection 14 and bearing stud 15 is to take endwise thrusts.

The shoes 13 can be readily seated in and engaged with the jaws 6 from either side of the head 5 after the member 9 has been inserted in the jaws. When the parts are properly thus assembled they are held against displacement by the guard 16, which is shown as being in the form of a cylinder adapted to fit over the head 5 and to be retained thereon by any suitable means, such as the locking stud 17. The convex ends 12 of the member 9 have a bearing on the inner surface of this guard under different angular adjustments of the coupling. When the guard is in place it effectively prevents displacement of the parts without interfering with their action. When removed or slipped back, the bearing shoes 13 can be readily removed from the side and the two members of the coupling quickly disengaged.

The parts of the coupling are few and simple in character and can be made capable of transmitting heavy loads and of withstanding rough shocks and usage, such as occur, for instance, in rolling mill practice.

I claim:

1. A flexible shaft coupling comprising two members to be coupled, one of said members having parallel jaws on the end thereof, the other member having a head thereon between the jaws on the first member, said head having curved bearing surfaces, and bearing shoes between the jaws and said head having bearing surfaces in engagement with the jaws and curved bearing surfaces engaging the head, the arrangement being such that the head or either of the bearing shoes may be separately removed in a transverse direction from between the jaws, and means engaging the ends of the head on the one member for restraining it against transverse movement between the jaws of the other member, substantially as described.

2. A flexible shaft coupling comprising two members to be coupled, one of said members having parallel jaws on the end thereof, the other member having a head thereon between the jaws on the first member, said head having curved bearing surfaces, and bearing shoes between the jaws and said head having bearing surfaces in engagement with the jaws and curved bearing surfaces engaging the head, the arrangement being such that the head and shoes may be simultaneously removed in a transverse direction from between the jaws or either of said members may be separately removed, a guard member on the first member for engaging the ends of the head and the ends of the bearing shoes for restraining said members from transverse movement between the jaws on the other member, and means for securing said guard member to the jaw member, substantially as described.

3. A flexible shaft coupling comprising two members to be coupled, one of said members having parallel jaws on the end thereof, the other member having a head thereon between the jaws on the first member, said head having curved bearing surfaces, bearing shoes between the jaws and said head having bearing surfaces in engagement with the jaws and curved bearing surfaces engaging the head, the arrangement being such that the head and shoes may be simultaneously removed in a transverse direction from between the jaws or either of said members may be separately removed, and a guard movable longitudinally over the first member and arranged to prevent the head and shoes on the second member from displacement in a transverse direction, substantially as described.

4. A flexible shaft coupling, comprising two members to be coupled, one of said members having a laterally open transverse slot or cut away portion at its end, and bearing shoes adapted to be inserted and removed from said slot through the open end thereof, and the other member to be coupled having a forwardly projecting neck carrying a head within said slot, said head having opposite convex surfaces in bearing engagement with corresponding concave surfaces of the bearing shoes, a central axially convex projection on the head of the one member, and a coöperative stud seated in the head of the other member to form a thrust member for said members, substantially as described.

In testimony whereof I have hereunto set my hand.

KIRTLAND C. GARDNER.

Witnesses:
 ALICE A. TRILL,
 A. T. GAST.